United States Patent
Ichitani et al.

(10) Patent No.: US 11,479,737 B2
(45) Date of Patent: *Oct. 25, 2022

(54) WATER-SOLUBLE QUENCHING OIL COMPOSITION

(71) Applicant: IDEMITSU KOSAN CO., LTD., Chiyoda-ku (JP)

(72) Inventors: Katsumi Ichitani, Chiba (JP); Rikki Homma, Yokohama (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 662 days.

This patent is subject to a terminal disclaimer.

(21) Appl. No.: 16/088,511

(22) PCT Filed: Mar. 31, 2017

(86) PCT No.: PCT/JP2017/013699
§ 371 (c)(1),
(2) Date: Sep. 26, 2018

(87) PCT Pub. No.: WO2017/171035
PCT Pub. Date: Oct. 5, 2017

(65) Prior Publication Data
US 2020/0354648 A1    Nov. 12, 2020

(30) Foreign Application Priority Data
Mar. 31, 2016  (JP) .............................. JP2016-073506

(51) Int. Cl.
| | | |
|---|---|---|
| *C10M 173/02* | (2006.01) | |
| *C10N 40/20* | (2006.01) | |
| *C10M 107/34* | (2006.01) | |
| *C10M 129/16* | (2006.01) | |
| *C10M 129/32* | (2006.01) | |
| *C10M 133/08* | (2006.01) | |
| *C10M 145/36* | (2006.01) | |

(52) U.S. Cl.
CPC ........ *C10M 173/02* (2013.01); *C10M 107/34* (2013.01); *C10M 129/16* (2013.01); *C10M 129/32* (2013.01); *C10M 133/08* (2013.01); *C10M 145/36* (2013.01); *C10N 2040/243* (2020.05)

(58) Field of Classification Search
CPC .............. C10M 173/02; C10M 145/36; C10M 2215/223; C10M 129/32; C10M 107/34; C10M 129/16; C10M 2209/104; C10M 2207/046; C10M 2209/103; C10M 133/08; C10M 2207/125; C10M 2215/042; C10M 2201/02; C10N 2040/243; C10N 2040/242; C10N 2020/04; C08K 5/09; C08K 5/17; C08K 5/06; C08L 71/02; C21D 1/60
See application file for complete search history.

(56) References Cited

U.S. PATENT DOCUMENTS

| | | |
|---|---|---|
| 5,766,505 A | 6/1998 | Kanamori et al. |
| 2011/0147645 A1 | 6/2011 | Kawasaki |
| 2013/0001461 A1 | 1/2013 | Ichitani et al. |

FOREIGN PATENT DOCUMENTS

| | | |
|---|---|---|
| JP | 6-336607 A | 12/1994 |
| JP | 8-231977 A | 9/1996 |
| JP | 9-227932 A | 9/1997 |
| JP | 10-324887 A | 12/1998 |
| JP | 2002-265973 A | 9/2002 |
| JP | 2011-168860 A | 9/2011 |
| JP | 2011-190330 A | 9/2011 |
| JP | 2014-125680 A | 7/2014 |
| TW | 201343923 A | 11/2013 |
| TW | 201437269 A | 10/2014 |
| TW | 201540825 A | 11/2015 |
| WO | WO 2010/021299 A1 | 2/2010 |

OTHER PUBLICATIONS

International Search Report dated Jun. 6, 2017 in PCT/JP2017/013699 filed Mar. 31, 2017.
Combined Chinese Office Action and Search Report dated Feb. 26, 2020, in Patent Application No. 201780020494.1, citing document AQ therein, 21 pages (with unedited computer generated English translation and English Translation of Category of Cited Documents).
Taiwanese Office Action dated Feb. 27, 2020, in Patent Application No. 106111263, citing documents AO-AP therein, 4 pages (with English Translation of Category of Cited Documents).

*Primary Examiner* — Vishal V Vasisth
(74) *Attorney, Agent, or Firm* — Oblon, McClelland, Maier & Neustadt, L.L.P.

(57) ABSTRACT

A water-soluble quenching fluid composition prepared by blending: water, at least one kind selected from a polyoxyalkylene glycol and a derivative thereof (A), and an alkylene glycol ether (B), the polyoxyalkylene glycol or a derivative thereof (A) having a mass average molecular weight of 10,000 or more and 100,000 or less, the alkylene glycol ether (B) having a solubility in 100 mL of water at 20° C. of 2.0 g/100 mL-$H_2O$ or less and a molecular weight per 1 mol of 1,000 g/mol or less.

20 Claims, No Drawings

WATER-SOLUBLE QUENCHING OIL COMPOSITION

This application is a 371 of PCT/JP2017/013699 filed Mar. 31, 2017.

FIELD OF INVENTION

The present invention relates to a water-soluble quenching fluid composition.

BACKGROUND ART

Quenching of metals is to improve the mechanical properties of metals by utilizing transformation thereof, and a quenching fluid is generally used in the cooling process thereof. The cooling process using a quenching fluid can be dissected into a vapor blanket stage, a boiling stage, and a convection stage.

For a large metal member or a metal member having poor hardenability, there is a tendency that an oily cooling medium is insufficient in cooling capability and thus an aqueous cooling medium may be employed in some cases. However, after breaking the vapor blanket, the treated material is rapidly cooled to around 100° C. since the boiling point of water is 100° C. Accordingly the water-soluble cooling medium tends to cause cooling unevenness and has a large cooling rate after breaking the vapor blanket, resulting in a risk of cracking of the treated material (quenching cracks).

Approaches have been made to avoid the aforementioned disadvantage of the aqueous cooling medium. PTL 1 describes that the characteristic number of second is shortened by using an aqueous cooling medium having an inorganic salt blended therein.

PTL 2 describes that a water-soluble quenching fluid containing a combination of a polyalkylene glycol or a derivative thereof having a particular molecular weight and a glycol monoether is excellent in quenching crack preventing capability quenching capability and quenching unevenness preventing capability.

CITATION LIST

Patent Literatures

PTL 1: JP 2014-125680 A
PTL 2: JP 9-227932 A

SUMMARY OF INVENTION

Technical Problem

The vapor blanket formed on the metal surface prevents the quenching agent liquid and the surface of the treated material from being brought into direct contact with each other, and the vapor blanket inhibits thermal migration due to the small thermal conductivity thereof, resulting in a small cooling rate in the vapor blanket stage. Accordingly in the case where the quenching is performed with a water-soluble quenching agent, the breaking behavior of the vapor blanket formed on the surface of the treated metal largely influences the cooling characteristics of the quenching agent. Therefore, the characteristic number of second, which shows the period of time of transition from the vapor blanket stage to the boiling stage, is an important characteristic value of the cooling characteristics. The aqueous cooling medium of PTL 1 can shorten the characteristic number of second, but is insufficient in cooling rate after breaking the vapor blanket, and thus is still insufficient in prevention of cracks of the treated material. The characteristic number of seconds described in PTLs 1 and 2 are both insufficient for providing excellent cooling characteristics of the quenching fluid.

An object of the present invention is to provide a water-soluble quenching fluid composition that has a sufficient cooling rate in the temperature range defined in JIS K2242: 2012 after breaking the vapor blanket, and simultaneously achieves an extremely short characteristic number of second as compared to the ordinary water-soluble quenching fluid agent.

Solution to Problem

As a result of earnest investigations made by the present inventors, it has been found that the problem can be solved by a water-soluble quenching fluid composition having blended as additives therein at least one kind selected from a particular polyoxyalkylene glycol and a derivative thereof, and a particular alkylene glycol ether, and thus the present invention has been completed.

The present invention provides the following items [1] to [3].

[1] A water-soluble quenching fluid composition prepared by blending:
water,
at least one kind selected from a polyoxyalkylene glycol and a derivative thereof (A), and
an alkylene glycol ether (B),
the polyoxyalkylene glycol or a derivative thereof (A) having a mass average molecular weight of 10,000 or more and 100,000 or less,
the alkylene glycol ether (B) having a solubility in 100 mL of water at 20° C. of 2.0 g/100 mL-$H_2O$ or less and a molecular weight per 1 mol of 1,000 g/mol or less.

[2] A concentrated liquid of the water-soluble quenching fluid composition according to the item [1].

[3] A quenching method including: quenching a member containing a metal; and then cooling with the water-soluble quenching fluid composition according to the item [1].

Advantageous Effects of Invention

According to the present invention, a water-soluble quenching fluid composition can be provided that has a sufficient cooling rate in the temperature range defined in JIS K2242:2012, Annex A (Method B), and simultaneously achieves an extremely short characteristic number of second.

DESCRIPTION OF EMBODIMENTS

Embodiments of the present invention will be described in detail below.

[Water-Soluble Quenching Fluid Composition]

The water-soluble quenching fluid composition according to the present embodiment is prepared by blending at least one kind selected from the component (A) and the component (B).

The aforementioned "water-soluble quenching fluid composition prepared by blending at least one kind selected from the component (A) and the component (B)" includes a "water-soluble quenching fluid composition containing at least one kind selected from the component (A) and the component (B)" as the new composition. The water-soluble quenching fluid composition may contain other additives in such a range that does not impair the effects of the present embodiment.

The "characteristic number of second" in the present embodiment means a "characteristic number of second" that is measured according to JIS K2242:2012, Annex A (Method B).

The "cooling rate" in the present embodiment means a cooling rate that is calculated from a cooling time in a temperature range of from 350° C. to 150° C. measured according to JIS K2242:2012, Annex A (Method B).

<Polyoxyalkylene Glycol and Derivative Thereof (A)>

The water-soluble quenching fluid composition of the present embodiment contains blended therein at least one kind selected from a polyoxyalkylene glycol and a derivative thereof (A), and the polyoxyalkylene glycol or a derivative thereof (A) necessarily has a mass average molecular weight of 10,000 or more and 100,000 or less.

The polyoxyalkylene glycol or a derivative thereof (A) used has a mass average molecular weight in a range of 10,000 or more and 100,000 or less. The mass average molecular weight that is less than 10,000 is not preferred since it is difficult to provide a water-soluble quenching fluid composition having a sufficient cooling rate. The mass average molecular weight that exceeds 100,000 is not preferred since the viscosity of the composition itself is increased to cause deterioration of the handleability, contamination of the material, carryover of the liquid with the material, and the like. The mass average molecular weight of the polyoxyalkylene glycol or a derivative thereof (A) is preferably 12,000 or more and 80,000 or less, and more preferably 14,000 or more and 50,000 or less. The mass average molecular weight herein is a polystyrene conversion value by the gel permeation chromatography (GPC) method.

The polyoxyalkylene glycol or a derivative thereof (A) is not particularly limited, as far as it has an oxyalkylene unit as a repeating unit and has a mass average molecular weight in a range of 10,000 or more and 100,000 or less. Preferred examples of the polyoxyalkylene glycol or a derivative thereof (A) include a compound represented by the following general formula (I):

$$R^1O-(R^4O)_n-R^2 \quad (I)$$

In the formula, $R^4$ represents an alkylene group having from 2 to 6 carbon atoms; $R^1$ and $R^2$ each independently represent a hydrogen atom, an alkyl group having from 1 to 10 carbon atoms, an acyl group having from 1 to 11 carbon atoms, or a saturated or unsaturated alicyclic hydrocarbon group or aromatic hydrocarbon group having from 5 to 18 carbon atoms, which may have a substituent; and n represents a number that provides a weight average molecular weight of the compound in a range of 10,000 or more and 100,000 or less. In the case where there are plural units represented by ($R^4O$), i.e., in the case where n≥2, the plural units represented by ($R^4O$) may be the same as or different from each other. In the case where the oxyalkylene units ($R^4O$) are different from each other, the compound is a copolymer, which may be any of a random copolymer and a block copolymer.

The polyoxyalkylene glycol or a derivative thereof (A) is preferably water-soluble.

Preferred examples of the polyoxyalkylene glycol or a derivative thereof (A) include the polyoxyalkylene glycol, in which the ($R^4O$) unit in the formula (1) is constituted by one kind of an alkylene oxide, such as ethylene oxide, propylene oxide, and butylene oxide, the polyoxyalkylene glycol, in which the ($R^4O$) unit in the formula (1) is constituted by two or more kinds of alkylene oxides selected from ethylene oxide, propylene oxide, butylene oxide, and the like, and a derivative of the polyoxyalkylene glycol, in which at least one of the ends of the formula (1), i.e., $R^1$ and $R^2$ represents an alkyl group having from 1 to 10 carbon atoms, an acyl group having from 1 to 11 carbon atoms, or a saturated or unsaturated alicyclic hydrocarbon group or aromatic hydrocarbon group having from 5 to 18 carbon atoms, which may have a substituent.

Examples of the alkyl group having from 1 to 10 carbon atoms represented by $R^1$ and $R^2$ include a methyl group, an ethyl group, a n-propyl group, an isopropyl group, a n-butyl group, an isobutyl group, a sec-butyl group, a tert-butyl group, a hexyl group, a 2-ethylhexyl group, a heptyl group, an octyl group, a nonyl group, and a decyl group. Examples of the acyl group having from 1 to 11 carbon atoms include groups each having the group that is specifically shown as the alkyl group having from 1 to 10 carbon atoms, such as a methyl group and an ethyl group, and a carbonyl group.

Examples of the saturated alicyclic hydrocarbon group having from 5 to 18 carbon atoms represented by $R^1$ and $R^2$ include a cyclopentyl group, a cyclohexyl group, a cycloheptyl group, a cyclooctyl group, a cyclononyl group, and a cyclodecyl group. Examples of the unsaturated alicyclic hydrocarbon group having from 5 to 18 carbon atoms include the aforementioned saturated alicyclic hydrocarbon groups each having at least one unsaturated bond, such as a cyclopentenyl group and a cyclohexenyl group. Specific examples of the aromatic hydrocarbon group having from 5 to 18 carbon atoms include aryl groups, such as a phenyl group and a naphthyl group.

Examples of the substituent include $C_1$-$C_6$ alkyl groups, $C_1$-$C_6$ alkoxy groups, and $C_6$-$C_{14}$ aryl groups.

Specific examples of the polyoxyalkylene glycol include polyoxyethylene polyoxypropylene glycol.

At least one kind selected from the polyoxyalkylene glycol or a derivative thereof (A) is blended, and two or more kinds thereof may be blended. The amount of at least one kind selected from the polyoxyalkylene glycol or a derivative thereof (A) blended in the water-soluble quenching fluid composition of the present embodiment is preferably 0.1% by mass or more and 30% by mass or less based on the total amount of the composition. The amount thereof blended means the amount of the polyoxyalkylene glycol or a derivative thereof (A) itself, and in the case where plural kinds of the polyoxyalkylene glycol or a derivative thereof (A) are contained, the amount means the total amount thereof. The amount of at least one kind selected from the polyoxyalkylene glycol or a derivative thereof (A) that is in the aforementioned range is preferred since a sufficient cooling rate can be ensured after breaking the vapor blanket. The amount of at least one kind selected from the polyoxyalkylene glycol or a derivative thereof (A) blended is more preferably 1% by mass or more and 25% by mass or less, and further preferably 2% by mass or more and 20% by mass or less, based on the total amount of the composition.

<Alkylene Glycol Ether (B)>

In the present embodiment, the alkylene glycol ether (B) blended in the water-soluble quenching fluid composition necessarily has a solubility in 100 mL of water at 20° C. of 2.0 g/100 mL-$H_2O$ or less and a molecular weight per 1 mol of 1,000 g/mol or less.

When the solubility in 100 mL of water at 20° C. of the alkylene glycol ether (B) exceeds 2.0 g/100 mL-$H_2O$, the extremely short characteristic number of second, which is one of the effects of the present embodiment, may not be achieved.

The solubility in 100 mL of water at 20° C. of the alkylene glycol ether (B) is preferably 1.0 g/100 mL-H₂O or less, more preferably 0.001 g/100 mL-H₂O or more and 1.0 g/100 mL-H₂O or less.

The molecular weight per 1 mol of the alkylene glycol ether (B) is necessarily 1,000 g/mol or less. When the molecular weight per 1 mol exceeds 1,000 g/mol, it is difficult to achieve the extremely short characteristic number of second.

The molecular weight per 1 mol of the alkylene glycol ether (B) is preferably 75 g/mol or more, more preferably 100 g/mol or more, further preferably 140 g/mol or more, and particularly preferably 160 g/mol or more. The molecular weight per 1 mol of the alkylene glycol ether (B) is preferably 500 g/mol or less, and more preferably 250 g/mol or less.

The alkylene glycol ether (B) is not particularly limited, as far as it has a solubility in 100 mL of water at 20° C. of 2.0 g/100 mL-H₂O or less and a molecular weight per 1 mol of 1,000 g/mol or less.

Examples of the alkylene glycol ether (B) include a compound represented by the following general formula (II):

$$R^{11}O-(R^BO)_m-R^{12} \quad (II)$$

In the formula, $R^B$ represents an alkylene group having from 2 to 6 carbon atoms; $R^{11}$ and $R^{12}$ each independently represent a hydrogen atom, an alkyl group having from 1 to 10 carbon atoms, an acyl group having from 1 to 11 carbon atoms, or a saturated or unsaturated alicyclic hydrocarbon group or aromatic hydrocarbon group having from 5 to 18 carbon atoms, which may have a substituent, provided that at least one of $R^{11}$ and $R^{12}$ represents an alkyl group having from 1 to 10 carbon atoms or a saturated or unsaturated alicyclic hydrocarbon group or aromatic hydrocarbon group having from 5 to 18 carbon atoms, which may have a substituent; and m represents a number that provides a molecular weight per 1 mol of the compound in a range of 1,000 g/mol or less. In the case where there are plural units represented by ($R^BO$), i.e., in the case where m≥2, the plural units represented by ($R^BO$) may be the same as or different from each other. In the case where the oxyalkylene units ($R^BO$) are different from each other, the compound is a copolymer, which may be any of a random copolymer and a block copolymer.

Preferred examples of the alkylene glycol ether include the alkylene glycol, in which the ($R^BO$) unit in the formula (1) is constituted by one kind of an alkylene oxide, such as ethylene oxide, propylene oxide, and butylene oxide, or two or more kinds of alkylene oxides selected from ethylene oxide, propylene oxide, butylene oxide, and the like, and at least one of the ends of the formula (1), i.e., $R^{11}$ and $R^{12}$ represents an alkyl group having from 1 to 10 carbon atoms. In the examples, an alkylene glycol monoether, in which any one of $R^{11}$ and $R^{12}$ is a hydrogen atom, can be exemplified.

Examples of the alkyl group having from 1 to 10 carbon atoms represented by $R^{11}$ and $R^{12}$ include a methyl group, an ethyl group, a n-propyl group, an isopropyl group, a n-butyl group, an isobutyl group, a sec-butyl group, a tert-butyl group, a hexyl group, a 2-ethylhexyl group, a heptyl group, an octyl group, a nonyl group, and a decyl group. Examples of the acyl group having from 1 to 11 carbon atoms include groups each having the group that is specifically shown as the alkyl group having from 1 to 10 carbon atoms, such as a methyl group and an ethyl group, and a carbonyl group.

Examples of the saturated alicyclic hydrocarbon group having from 5 to 18 carbon atoms represented by $R^{11}$ and $R^{12}$ include a cyclopentyl group, a cyclohexyl group, a cycloheptyl group, a cyclooctyl group, a cyclononyl group, and a cyclodecyl group. Examples of the unsaturated alicyclic hydrocarbon group having from 5 to 18 carbon atoms include the aforementioned saturated alicyclic hydrocarbon groups each having at least one unsaturated bond, such as a cyclopentenyl group and a cyclohexenyl group. Examples of the aromatic hydrocarbon group having from 5 to 18 carbon atoms include aryl groups, such as a phenyl group and a naphthyl group.

Examples of the substituent include $C_1$-$C_6$ alkyl groups, $C_1$-$C_6$ alkoxy groups, and $C_6$-$C_{14}$ aryl groups.

The alkylene glycol ether is preferably an alkylene glycol monoalkyl ether having a unit derived from ethylene glycol, propylene glycol, or dipropylene glycol. Examples thereof include an ethylene glycol monoalkyl ether, such as ethylene glycol monohexyl ether, ethylene glycol monooctyl ether, ethylene glycol monodecyl ether, and ethylene glycol monolauryl ether; and an alkylene glycol monoalkyl ether, such as a polyalkylene glycol monoalkyl ether having a propyleneoxy group or a butyleneoxy group instead of the ethyleneoxy group of the aforementioned ethylene glycol monoalkyl ether, e.g., propylene glycol monohexyl ether, 1-(2-butylbutoxy)propan-2-ol, dipropylene glycol monopropyl ether, and dipropylene glycol monobutyl ether. The alkylene glycol ether may be used alone or as a combination of two or more kinds thereof.

In the present embodiment, the amount of the alkylene glycol ether (B) blended in the water-soluble quenching fluid composition is preferably 0.1% by mass or more and 10% by mass or less based on the total amount of the composition. When the amount thereof blended is in the range, a sufficient cooling rate can be ensured, and simultaneously the characteristic number of second obtained from the cooling curve can be extremely shortened. The "amount of the alkylene glycol ether (B) blended" in the case where two or more kinds of the alkylene glycol ethers (B) are used in combination means the total amount thereof.

The amount of the alkylene glycol ether (B) blended is more preferably 0.15% by mass or more and 5% by mass or less, and further preferably 0.2% by mass or more and 3% by mass or less, based on the total amount of the composition.

<Monocarboxylic Acid (C)>

The water-soluble quenching fluid composition of the present embodiment may further contain a monocarboxylic acid (C) blended therein. The monocarboxylic acid is preferably used since the monocarboxylic acid functions as a dissolution aid for the component (B) in water, and can retain the stability of the liquid.

In the present embodiment, the monocarboxylic acid (C) is not particularly limited, and a monocarboxylic acid having a main chain having a number of carbon atoms of 4 or more and 11 or less is preferred. In the present embodiment, the number of carbon atoms of the main chain of the monocarboxylic acid includes the carboxy group-forming carbon atom. In the present embodiment, the main chain is determined according to the IUPAC nomenclature system.

The monocarboxylic acid (C) is preferably at least one kind selected from caproic acid, caprylic acid, nonanoic acid, and 3,5,5-trimethylhexanoic acid, and more preferably 3,5,5-trimethylhexanoic acid. The number of carbon atoms of the main chain of the monocarboxylic acid (C) is more preferably 5 or more and 10 or less, and further preferably 6 or more and 9 or less.

In the present embodiment, the amount of the monocarboxylic acid (C) blended in the water-soluble quenching fluid composition is preferably 0.05% by mass or more and 10% by mass or less based on the total amount of the composition. In the case where the monocarboxylic acid (C) is blended, the amount thereof blended that is in the range is preferred since the liquid of the water-soluble quenching fluid composition is stabilized.

The amount of the monocarboxylic acid (C) blended is more preferably 0.1% by mass or more and 8% by mass or less, and further preferably 0.5% by mass or more and 5% by mass or less, based on the total amount of the composition.

<Alkanolamine>

The water-soluble quenching fluid composition of the present embodiment preferably contains an alkanolamine blended therein.

The alkanolamine is not particularly limited, as far as it does not impair the effects of the present embodiment. For example, an alkanolamine having a number of carbon atoms of 1 or more and 12 or less, more preferably 2 or more and 9 or less, may be preferably blended. Specific examples of the alkanolamine include monoethanolamine, diethanolamine, triethanolamine, monomethanol-diethanolamine, monoisopropanolamine, triisopropanolamine, monocyclohexylethanolamine, dicyclohexylethanolamine, mono(2-methylcyclopentyl)ethanolamine, and cyclohexyldiethanolamine.

The amount of the alkanolamine blended is not particularly limited, and is generally 0.1% by mass or more and 10% by mass or less, preferably 1% by mass or more and 8% by mass or less, and more preferably 2% by mass or more and 5% by mass or less, based on the total amount of the composition.

<Additional Components>

The water-soluble quenching fluid composition of the present embodiment may further contain blended therein additional additives that have been commonly used in a water-soluble quenching fluid, depending on necessity in such a range that does not impair the object of the present embodiment. As the additional additives, for example, a corrosion inhibitor, such as benzotriazole or tolyltriazole, a rust inhibitor, a copper deactivator, an antioxidant, a silicone anti-foaming agent, a colorant, an inorganic acid salt as a coolant, such as potassium pyrophosphate, and the like may be appropriately blended. As an aliphatic carboxylic acid other than the monocarboxylic acid (C), an aliphatic dicarboxylic acid may be blended. Examples of the aliphatic dicarboxylic acid include a saturated aliphatic dicarboxylic acid, such as octanedioic acid (suberic acid), nonanedioic acid (azelaic acid), decanedioic acid (sebacic acid), undecanedioic acid, dodecanedioic acid, tridecanedioic acid, tetradecanedioic acid, hexadecanedioic acid, octanedioic acid, eicosanedioic acid, docosanedioic acid, tetracosanedioic acid, hexacosanedioic acid, and octacosanedioic acid (these dicarboxylic acid may be straight-chain or branched).

The content of the additives may be appropriately controlled within a range that does not impair the effects of the present invention. The content of the additives is generally 0.001% by mass or more and 10% by mass or less, preferably 0.005% by mass or more and 8% by mass or less, more preferably 0.01% by mass or more and 5% by mass or less, and further preferably 0.05% by mass or more and 1% by mass or less, based on the total amount (100% by mass) of the lubricating oil composition. In the case where plural components are contained as the additives, the components are independently contained in the aforementioned range.

The total amount of the water, the components (A) to (C), the alkanolamine, and the additional components blended in the water-soluble quenching fluid composition of the present embodiment does not exceed 100% by mass.

<Water>

The water contained in the water-soluble quenching fluid composition of the present embodiment is not particularly limited, and any of distilled water, ion-exchanged water, tap water, industrial water, and the like may be used.

The content of the water in the water-soluble quenching fluid composition of the present embodiment is not particularly limited, and may be selected from a wide range including the balance of the total of the components (A) to (C), the alkanolamine, and the additional components (the total of the components and the water is 100% by mass). The content of the water is generally selected from a wide range of from 50 to 99% by mass, and is preferably from 60 to 98% by mass, and more preferably from 70 to 97% by mass.

In one embodiment of the present invention, the total content of the water, the component (A), the component (B), and the component (C) is preferably from 80 to 100% by mass, and more preferably from 95 to 100% by mass, based on the total amount (100% by mass) of the water-soluble quenching fluid composition.

In one embodiment of the present invention, the total content of the water, the component (A), the component (B), and the component (C), the alkanolamine, and the additional additives is preferably from 90 to 100% by mass, and more preferably from 95 to 100% by mass, based on the total amount (100% by mass) of the water-soluble quenching fluid composition.

The water-soluble quenching fluid composition of the present embodiment has a sufficient cooling rate and simultaneously achieves an extremely short characteristic number of second. The characteristic number of second achieves a characteristic number of second measured at a liquid temperature of 40° C. according to JIS K2242:2012, Annex A (Method B) of less than 0.1 second, which is a drastically short characteristic number of second as compared to the ordinary water-soluble quenching fluid, thus exhibiting excellent cooling capability. The water-soluble quenching fluid composition of the present embodiment can have a sufficient cooling rate around from 190 to 300 seconds after breaking the vapor blanket.

According to the present embodiment, a concentrated liquid prepared by concentrating the water-soluble quenching fluid composition is also provided. The concentrated liquid is preferred in expediency of storage and transportation.

The concentrated liquid in the present embodiment is preferably obtained by concentrating the water-soluble quenching fluid composition by from 2 to 30 times, more preferably from 2.5 to 25 times, and further preferably from 3 to 20 times.

A method of quenching according to the present embodiment is then described below.

<Quenching Method and Use>

The present embodiment also provides a quenching method including: quenching a member containing a metal; and then cooling with the aforementioned water-soluble quenching fluid composition. The aforementioned water-soluble quenching fluid composition has a sufficient cooling rate and simultaneously an extremely short characteristic number of second. Therefore, the quenching method of the present embodiment is preferred since cracks and quenching distortion due to cooling unevenness of the metal member treated can be significantly suppressed.

The present embodiment also provides use of the water-soluble quenching fluid composition on cooling a member containing a metal after quenching.

The quenching method of the present embodiment may be soaking quenching, high-frequency quenching, and the like.

EXAMPLES

The present embodiment will be described more specifically with reference to examples below, but the present embodiment is not limited thereto.

Examples 1 and 2 and Comparative Examples 1 to 7

Water-soluble quenching fluid compositions were prepared according to the blended materials and the formulations shown in Table 1.

The water-soluble quenching fluid compositions each were evaluated for the cooling capability by the following evaluation methods. The results are shown in Table 1.
[Evaluation Methods]
(1) Evaluation of Cooling Property A cooling curve was obtained for each of the quenching fluid compositions at a liquid temperature 40° C. according to the cooling property test defined in JIS K2242:2012, Annex A (Method B).
(1.1) Characteristic Number of Second The period of time (number of seconds) until reaching the characteristic temperature (i.e., the temperature, at which the vapor blanket stage ended) was obtained from the cooling curve.
(1.2) Cooling Rate The cooling rate in the temperature range of from 350° C. to 150° C. was calculated in the cooling curve.

The blended materials in Tables 1 and 2 are as follows.
(A) Polyoxyalkylene Glycol or Derivative Thereof Polyoxyethylene polyoxypropylene glycol (mass average molecular weight: 15,000, degree of polydispersion (Mw/Mn): 1.5, ethylene oxide/propylene oxide: 72/28)
(B) Alkylene Glycol Ether (Hereinafter the "Solubility" Means the Solubility in 100 mL of Water at 20° C. with in Terms of g/100 mL-$H_2O$)

Ethylene glycol monohexyl ether (solubility: 0.99 g/100 mL-$H_2O$, molecular weight per 1 mol: 146.3)

Propylene glycol monohexyl ether (solubility: 0.4 g/100 mL-$H_2O$, molecular weight per 1 mol: 160.3)
(Additional Alkylene Glycol Monoalkyl Ether)

Propylene glycol monobutyl ether (solubility: 6.4 g/100 mL-$H_2O$, molecular weight per 1 mol: 132.2 g/mol)

Dipropylene glycol monobutyl ether (solubility: 3.0 g/100 mL-$H_2O$, molecular weight per 1 mol: 190.3 g/mol)

Ethylene glycol monobutyl ether (easily soluble, molecular weight per 1 mol: 118.2 g/mol)

Diethylene glycol monobutyl ether (easily soluble, molecular weight per 1 mol: 162.3)
(C) Monocarboxylic Acid 3,5,5-trimethylhexanoic acid (number of carbon atoms of main chain: 6)
<Alkanolamine>
Cyclohexyldiethanolamine
<Water>
Ion-exchanged water
<Additional Components>
Benzotriazole, dodecanedioic acid, potassium pyrophosphate It is understood that the water-soluble quenching fluid compositions of Examples have a sufficient cooling rate after breaking the vapor blanket, and simultaneously

TABLE 1

| | | | Example | | Comparative Example | | | | | | |
|---|---|---|---|---|---|---|---|---|---|---|---|
| | | Unit | 1 | 2 | 1 | 2 | 3 | 4 | 5 | 6 | 7 |
| Polyoxyalkylene glycol (A) | Polyoxyethylene polyoxypropylene glycol | wt % | 3.1 | 3.1 | | 3.1 | 3.1 | 3.1 | 3.1 | | 3.1 |
| Alkylene glycol ether (B) | Solubility in 100 mL of water (20° C.) | | | | | | | | | | |
| | Ethylene glycol monohexyl ether | 0.99 g/100 mL · $H_2O$ | wt % | 1 | | | | | | | | |
| | Propylene glycol monohexyl ether | 0.4 g/100 mL · $H_2O$ | wt % | | 0.5 | | | | | | | |
| Alkylene glycol ether | Propylene glycol monobutyl ether | 6.4 g/100 mL · $H_2O$ | wt % | | | | | 1 | | | | |
| | Dipropylene glycol monobutyl ether | 3.0 g/100 mL · $H_2O$ | wt % | | | | 1 | | | | | |
| | Ethylene glycol monobutyl ether | easily soluble | wt % | | | | | | 1 | | | |
| | Diethylene glycol monobutyl ether | easily soluble | wt % | | | | | | | 1 | | |
| Monocarboxylic acid (C) | 3,5,5-trimethylhexanoic acid | | wt % | 1 | 2.1 | 1 | | | | | | 1 |
| Alkanolamine | Cyclohexyldiethanolamine | | wt % | 2.4 | 3.6 | 2.4 | 0.4 | | | | | 2.4 |
| Additional component | Dodecanedioic acid | | wt % | 0.1 | 0.1 | 0.1 | 0.1 | | | | | 0.1 |
| | Benzotriazole | | wt % | 0.1 | 0.1 | 0.1 | 0.1 | | | | | 0.1 |
| | Potassium pyrophosphate | | wt % | | | 10 | | | | | | |
| Water | Ion-exchanged water | | wt % | 92.3 | 90.5 | 90.0 | 92.3 | 95.3 | 95.9 | 95.9 | 100.0 | 93.3 |
| | Total | | wt % | 100 | 100 | 100 | 100 | 100 | 100 | 100 | 100 | 100 |
| | Characteristic number of second | | sec | 0.1 > | 0.1 > | 0.1 > | 2.8 | 2.8 | 5.3 | 7.5 | 1.75 | 3.7 |
| Cooling capability | Cooling rate from 350° C. to 150° C. | | ° C./sec | 199 | 220 | 606.1 | 199 | 266 | 277.8 | 322.6 | 909 | 220 | achieves an extremely short characteristic number of second of less than 0.1 second, resulting in excellent cooling capability. Comparative Example 1 is a system containing potassium pyrophosphate, which is used as a coolant, blended therein, and has a considerably high cooling rate although the characteristic number of second is short. Comparative Examples 2 to 5 each containing a compound as the alkylene glycol ether, having a solubility in 100 mL of water at 20° C. exceeding 2.0 g/100 mL-H₂O are inferior in characteristic number of second as compared to Examples. Comparative Example 7 having the same formulation as Example 1 except that the component (B) is not contained cannot achieve an extremely short characteristic number of second.

INDUSTRIAL APPLICABILITY

According to the present embodiment, a water-soluble quenching fluid composition that has a sufficient cooling rate after breaking the vapor blanket, and simultaneously achieves an extremely short characteristic number of second, a concentrated liquid thereof, and a quenching method using the water-soluble quenching fluid composition on cooling can be provided.

The invention claimed is:

1. A composition, comprising, based on total composition mass:
water in a range of from 70 to 99% by mass:
an alkylene glycol ether (B), in a range of from 0.1 to 10% by mass; and
at least one selected from the group consisting of a polyoxyalkylene glycol and a derivative thereof (A), in a range of from 0.1 to 20% by mass,
wherein the polyoxyalkylene glycol or the derivative thereof (A) has a weight average molecular weight in a range of from more than 10,000 to 100,000,
wherein the polyoxyalkylene glycol or the derivative thereof (A) comprises a compound of formula (I):

$R^1$ and $R^2$ independently being H or, optionally substituted, an alkyl group having from 1 to 10 carbon atoms, an acyl group having from 1 to 11 carbon atoms, or a saturated or unsaturated alicyclic hydrocarbon group, or aromatic hydrocarbon group having from 5 to 18 carbon atoms, $R^4$ being an alkylene group having from 2 to 6 carbon atoms, and n being a number that provides a weight average molecular weight in a range of from more than 10,000 to 100,000,
wherein the alkylene glycol ether (B) has a molecular weight of 1,000 g/mol or less,
wherein the alkylene glycol ether (B) has a solubility in 100 mL of water at 20° C. of 2.0 g/100 mL-H₂O or less,
wherein the alkylene glycol ether (B) comprises ,

$R^{11}$ and $R^{12}$ independently being H or, optionally substituted, an alkyl group having from 1 to 10 carbon atoms, an acyl group having from 1 to 11 carbon atoms, or a saturated or unsaturated alicyclic hydrocarbon group or aromatic hydrocarbon group having from 5 to 18 carbon atoms, RB being an alkylene group having from 2 to 6 carbon atoms, m being a number that provides a molecular weight per 1 mol of the compound in a range of 1,000 g/mol or less, provided that at least one of $R^{11}$ and $R^{12}$ is, optionally substituted, an alkyl group having from 1 to 10 carbon atoms or a saturated or unsaturated alicyclic hydrocarbon group or aromatic hydrocarbon group having from 5 to 18 carbon atoms,
wherein the composition is suitable as a water-soluble quenching fluid composition.

2. The composition of claim 1, wherein the alkylene glycol ether (B) has a solubility in 100 mL of water at 20° C. of 1.0 g/100 mL-H₂O or less.

3. The composition of claim 1, wherein the alkylene glycol ether (B) is blended in an amount in a range of from 0.15 to 5% by mass, based on the total composition mass.

4. The composition of claim 1, wherein the at least one member selected from the group consisting of the polyoxyalkylene glycol and the derivative thereof (A) is blended in an amount in a range of from 1 to 20% by mass, based on the total water soluble quenching fluid composition mass.

5. The composition of claim 1, further comprising:
a monocarboxylic acid (C) blended therein.

6. The composition of claim 5, wherein the monocarboxylic acid (C) has a main chain having a number of carbon atoms in a range of from 4 to 11.

7. The composition of claim 5, wherein the monocarboxylic acid (C) is present in a range of from 0.05 to 10% by mass, based on the total composition mass.

8. The composition of claim 1, further comprising:
an alkanolamine blended in an amount in a range of from 0.1 to 10% by mass, based on total water-soluble quenching fluid composition mass.

9. The composition of claim 1, which has a characteristic number of seconds in a cooling curve obtained from the cooling property test defined in JIS K2242:2012, Annex A (Method B) of less than 0.1 second.

10. A concentrated liquid, obtained by concentrating the composition of claim 1.

11. A quenching method, comprising:
quenching a member comprising a metal; and then
cooling the member with the composition of claim 1.

12. The composition of claim 1, wherein a content of the water is in a range of from 90.5 to 99% by mass, based on total water-soluble quenching fluid composition mass.

13. The composition of claim 1, which has a characteristic number of seconds in a cooling curve obtained from the cooling property test defined in JIS K2242-2012, Annex A (Method B) of less than 0.1 second, and a sufficient cooling rate in a range of from 190 to 300 seconds after breaking the vapor blanket.

14. The composition of claim 5, wherein the monocarboxylic acid (C) is only one member selected from the group consisting of caproic acid, caprylic acid, nonanoic acid, and 3,5,5-trimethylhexanoic acid.

15. The composition of claim 1, wherein the water is present in a range of from 90.5 to 97% by mass, based on total composition mass.

16. The composition of claim 1, wherein the at least one selected from the group consisting of a polyoxyalkylene glycol and a derivative thereof (A) is present in a range of from 2 to 20% by mass, based on total composition mass.

17. The composition of claim 1, wherein the alkylene glycol ether (B) is present in a range of from 0.1 to 5% by mass, based on total composition mass.

18. The composition of claim 1, wherein the molecular weight of the alkylene glycol ether (B) is in a range of from 75 to 500 g/mol.

19. The composition of claim 1, wherein the molecular weight of the at least one selected from the group consisting of a polyoxyalkylene glycol and a derivative thereof (A) is in a range of from 12,000 to 100,000 g/mol.

20. A method of reducing a characteristic number of second in a water-soluble quenching fluid composition, the method comprising:

including both the alkylene glycol ether (B) and the at least one selected from the group consisting of a polyoxyalkylene glycol and a derivative thereof (A), in composition of claim 1, thereby improving the characteristic number of second over water-soluble quenching fluid compositions comprising only one of (A) or (B).

\* \* \* \* \*